Oct. 24, 1950     K. VOGELSBERG     2,527,283
HEATING SYSTEM REGULATORY DEVICE
Filed Aug. 16, 1947
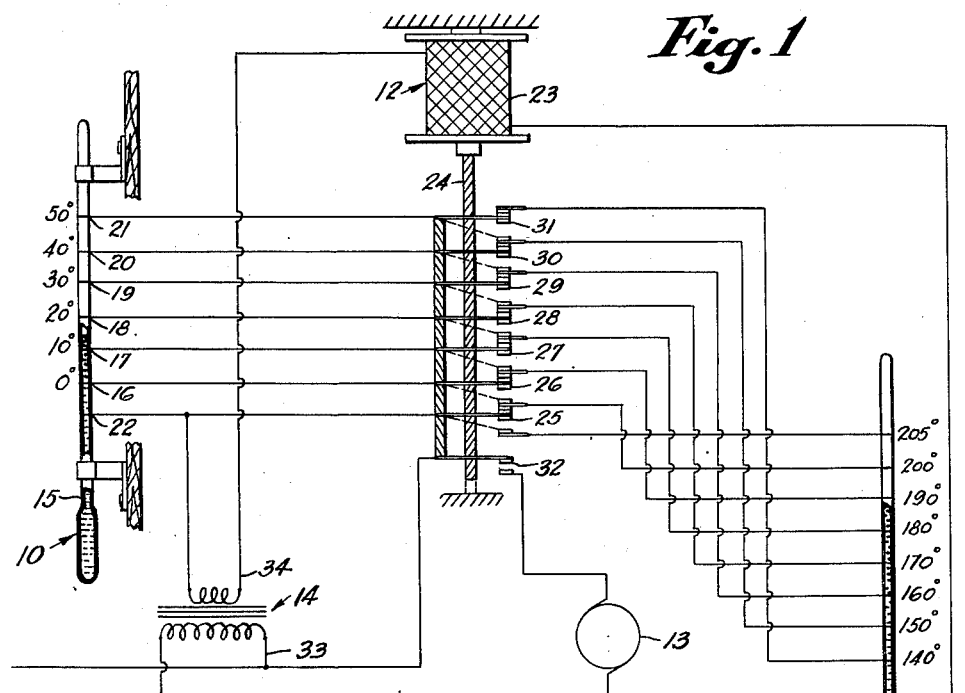
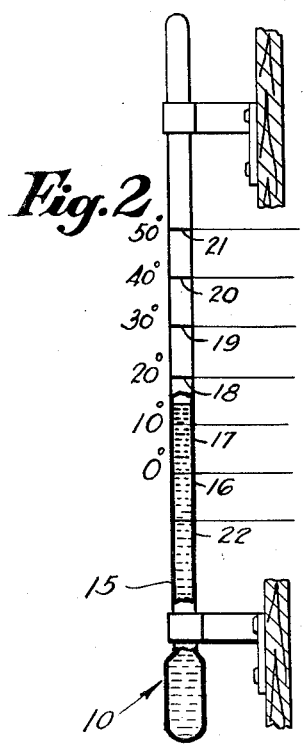
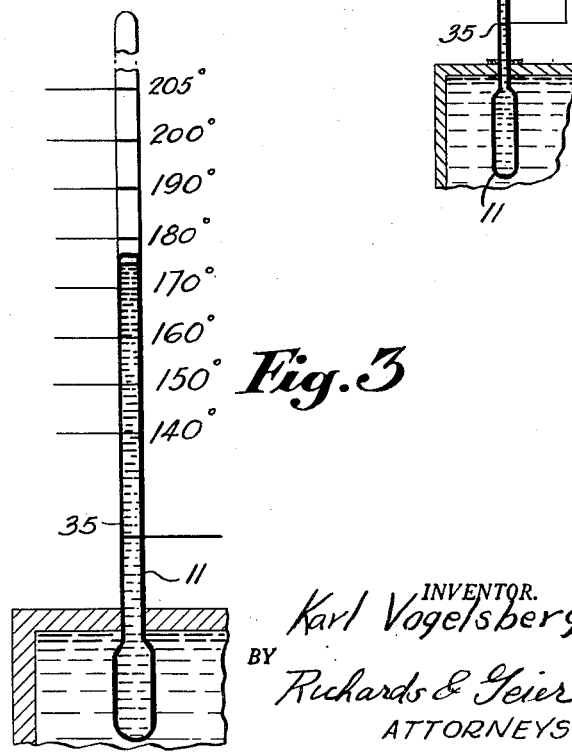
INVENTOR.
Karl Vogelsberg
BY Richards & Geier
ATTORNEYS Patented Oct. 24, 1950

2,527,283

UNITED STATES PATENT OFFICE 2,527,283

HEATING SYSTEM REGULATORY DEVICE

Karl Vogelsberg, Irvington, N. J.

Application August 16, 1947, Serial No. 769,057

3 Claims. (Cl. 236—91)

This invention relates to improvements in heating system regulatory devices.

As presently constituted, devices regulatory of heating systems require manual adjustment in accordance with the desires of the operator for more or less heat output.

It is an object of the present invention to provide a heating system regulatory device that is automatically controlled by variations in outdoor or indoor temperatures.

A further object is to provide a device that will conserve fuel.

Other objects will become apparent in the course of the following specification.

In the accomplishment of these objectives at least two mercury thermometers, one solenoid, one furnace pump, and one transformer are used.

One thermometer is adapted to be installed outdoors and is of the mercury type although other types of thermometers obviously could be used. The usual graduations may be placed along the mercury tube if desired. Electrical contacts are inserted in the tube at any desired intervals from the bottom to the top. The other thermometer is adapted to indicate variations in furnace temperatures and has electrical contacts as in the case of the outdoor thermometer. Electrical circuits in inverse order, that is between high points on the outdoor thermometer and low points on the furnace thermometer, are established and completed through the bases of the mercury columns. The solenoid provides a means for simultaneously breaking the circuits and closing a circuit to the furnace pump when the variations between outdoor and furnace thermometers are out of balance or the boiler temperature drops below any given contact point.

The invention will appear more clearly from the following detailed description when taken in connection with the accompanying drawings showing by way of example a preferred embodiment of the inventive idea.

In the drawings:

Figure 1 shows the circuit hookup of the heating system regulatory device constructed in accordance with the principles of this invention.

Figure 2 shows the outdoor thermometer with electrical contacts.

Figure 3 shows the furnace thermometer with electrical contacts.

Referring now in greater detail to the drawings in which like reference numerals indicate like parts, reference numeral 10 indicates the outdoor thermometer, 11 the furnace thermometer, 12 the solenoid, 13 the furnace unit, and 14 the transformer.

The outdoor thermometer 10 comprises the tube 15 adapted to be filled with mercury shown as standing above the 10° mark. The electrical contacts 16, 17, 18, 19, 20 and 21 are disposed in the tube 15 every 10° but could be spaced as desired. The contact 22 at the base of the tube 15 is for the return circuit as subsequently shown. Any suitable electrically non-conductive tube might be used.

The furnace thermometer 11 is similar to the previously mentioned outdoor thermometer 10 except that naturally it is formed and graduated to measure higher temperatures.

The solenoid 12 comprises the electro-magnet 23, the plunger 24, and single pole, double throw contacts 25, 26, 27, 28, 29, 30 and 31. Contact 32, at the base, is adapted to close the circuit to the unit 13.

The transformer 14 may be of the conventional type adapted to supply sufficient current to the coil of the electro-magnet 23 of the solenoid 12 for its operation. The primary 33 of the transformer 14 may be used for the operation of the unit 13 or otherwise, if desired.

The operation is as follows:

Assuming that the outside temperature is 14° as shown in Figure 1, the contacts 25, 26, 27, 28, 29, 30 and 31 of the solenoid 12 are in the up position due to current flowing through the electro-magnet 23 from the transformer 14. At the assumed 14° outdoor temperature, current flows from the secondary 34 of the transformer 14 into the mercury of the outside thermometer 10, up the tube 15, and out the wire at contact 17, through the contact 27 of the solenoid 12 and into the 180° contact point on the furnace thermometer 11. From the latter point, it goes down the mercury column and out the base contact 35 through the electro-magnetic coil 23 of the solenoid 12 and, thence, into the opposite side of the secondary 34 of the transformer 14 which retains the contacts 25, 26, 27, 28, 29, 30, and 31 in the up position. This condition will continue as long as there is no interruption of the circuit.

For example, suppose that the furnace cools below 180° then the circuit will be broken; when the current is interrupted, the solenoid 12 will lose its magnetism and the plunger 24 will drop carrying the blades to the positions shown by the dotted lines. Only when the circuit is interrupted do the contacts 25, 26, 27, 28, 29, 30, and 31 drop and the contact 32 closes the circuit to the furnace unit 13. Thus, the plunger 24 of the solenoid 12 drops and starts the furnace unit 13 operating. However, the unit won't shut off again until the furnace reaches the 190° mark because when the plunger 24 dropped it changed the circuit from the 180° contact to the 190°, as shown by the dotted line. When the furnace gets to 190° the circuit will be closed by the furnace thermometer 11 which will energize the solenoid 12 pulling up the contacts 25, 26, 27, 28, 29, 30 and 31, and interrupting the circuit to the furnace unit 13.

By way of example, let it be assumed that the outside temperature rose to 21°. Then the furnace thermometer will drop to 170°–180° contact, so that the furnace will not be energized again until the water cools to 170°.

This device can be used conveniently in any hot water heating system in conjunction with a circulator or gravity feed (not shown) which are controlled by room thermostats.

It is apparent that the described construction will result in a substantial saving of fuel since consumption of fuel will take place only when it is actually required by out of door conditions.

It is apparent that the specific example shown above has been given by way of illustration and not by way of limitation and that the structures above described are subject to wide variation and modification without departing from the scope or intent of the invention, all of which variations and modifications are to be included within the scope of the present invention.

What is claimed is:

1. Apparatus for controlling the operation of a heating system for an enclosure, such as a house, comprising a first thermal-responsive control means arranged to be responsive to the temperature variations of a part of said heating system, said control means including a plurality of contacts defining a plurality of predetermined discrete temperature ranges, a second thermal-responsive control means arranged to be responsive to the air temperature outside said enclosure, said second control means including a plurality of contacts defining a plurality of predetermined discrete temperature ranges, a row of stationary switch contacts, individual connections between said stationary contacts and the first-mentioned contacts, a plurality of ganged movable contacts respectively engageable with consecutive pairs of said stationary contacts, individual connections between said movable contacts and the second-mentioned contacts in inverse relation to the first-mentioned connections, a switch arranged to control the operation of said heating system and including a movable contact ganged with the aforementioned movable contacts, a solenoid arranged to actuate all of the ganged movable contacts in unison, and an energizing circuit for said solenoid extending between the aforementioned two thermal-responsive control means.

2. Apparatus for controlling the operation of a heating system for an enclosure, such as a house, comprising a first contact-making thermometer arranged to be responsive to the temperature variations of a part of said heating system, said thermometer having a plurality of contacts defining a plurality of predetermined discrete temperature ranges, a second contact-making thermometer arranged to be responsive to the air temperature outside said enclosure, said second thermometer having a plurality of contacts defining a plurality of predetermined discrete temperature ranges, a row of stationary switch contacts, individual connections between said stationary contacts and the first-mentioned contacts, a plurality of ganged movable contacts respectively engageable with consecutive pairs of said stationary contacts, individual connections between said movable contacts and the second-mentioned contacts in inverse relation to the first-mentioned connections, a switch arranged to control the operation of said heating system and including a movable contact ganged with the aforementioned movable contacts, a solenoid arranged to actuate all of the ganged movable contacts in unison, and an energizing circuit for said solenoid extending between said thermometers.

3. Apparatus for controlling the operation of a heating system for an enclosure, such as a house, comprising a first thermal-responsive control means arranged to be responsive to the temperature variations of a part of said heating system, said control means including a plurality of contacts defining a plurality of predetermined discrete temperature ranges, a second thermal-responsive control means arranged to be responsive to the air temperature outside said enclosure, said second control means including a plurality of contacts defining a plurality of predetermined discrete temperature ranges, a first row of switch contacts, individual connections between said switch contacts and the first-mentioned contacts, a second row of switch contacts respectively engageable with consecutive pairs of said first switch contacts, the two rows of switch contacts being relatively movable to effect such engagement, individual connections between said second switch contacts and the contacts of said second control means in inverse relation to the first-mentioned connections, a switch arranged to control the operation of said heating system, electrically-operable means for actuating the movable switch contacts and the last-recited switch, and an energizing circuit for said actuating means extending between the aforementioned two thermal-responsive control means.

KARL VOGELSBERG.

REFERENCES CITED

The following references are of record in the file of this patent:

UNITED STATES PATENTS

| Number | Name | Date |
| --- | --- | --- |
| 1,649,090 | Willhoeft | Nov. 15, 1927 |
| 1,883,015 | Shipley | Oct. 18, 1932 |
| 2,258,385 | Hartmann-Riis | Oct. 7, 1941 |

FOREIGN PATENTS

| Number | Country | Date |
| --- | --- | --- |
| 493,140 | Germany | Mar. 3, 1930 |
| 464,766 | France | July 17, 1928 |
| 803,814 | France | July 20, 1936 |